United States Patent [19]

Sutton et al.

[11] 3,982,209

[45] Sept. 21, 1976

[54] COMBUSTION-ELECTRIC LASER

[75] Inventors: George W. Sutton, Lexington; Diarmaid H. Douglas-Hamilton, Boston, both of Mass.

[73] Assignee: Avco Everett Research Laboratory, Inc., Everett, Mass.

[22] Filed: Oct. 17, 1974

[21] Appl. No.: 515,673

[52] U.S. Cl. .................. 331/94.5 G; 331/94.5 P; 330/4.3
[51] Int. Cl.² ........................ H01S 3/22; H01S 3/09
[58] Field of Search ................ 331/94.5 G; 330/4.3

[56] References Cited
UNITED STATES PATENTS

| 3,634,778 | 1/1972 | Melikian | 331/94.5 G |
|---|---|---|---|
| 3,720,885 | 3/1973 | Koloc | 331/94.5 G |

OTHER PUBLICATIONS

Vallach et al., Applied Physics Letters, 20, (10), 15, May 1972, pp. 395-397.

Plummer et al., AIAA Paper 73-623, AIAA 6A1 Fluid Plasma Dynomics Conf. July 1973, 7 pages.

*Primary Examiner*—Robert J. Webster
*Attorney, Agent, or Firm*—Charles M. Hogan; Melvin E. Frederick

[57] ABSTRACT

Working gas for an electron beam discharge laser is generated by an airbreathing, hydrocarbon fuel burning, turbocompressor engine and shaft power of the engine may be utilized to drive a generator to provide electric power to the laser or to drive a compressor to put the turbocompressor exhaust gases in compressed storage for later use in the laser, either mode affording savings in weight and cost of operating materials and/or specific energy conversion efficiency compared to prior art, electric, chemical and gas dynamic laser systems.

19 Claims, 4 Drawing Figures

COMBUSTION-ELECTRIC LASER

BACKGROUND OF THE INVENTION

The present invention relates to lasers and particularly to electrically excited flowing gas lasers utilizing a gaseous lasing mixture.

In recent years, substantial progress has been made in the development of high power $CO_2$ lasers in which the active gaseous medium flows through the working region in either the open or closed cycle CW or pulsed mode for flowing gas lasers or is sequentially replaced for the open or closed pulsed cycle mode of operation.

Electrically excited convection cooled $CO_2$ lasers appear to offer the greatest potential for applications requiring either high average power or high peak power. The very high power capability of $CO_2$ lasers (lasers however pumped using a gaseous lasing mixture including $CO_2$) was first demonstrated, with the gas dynamic type which does not utilize electrical excitation or pumping. For a comprehensive discussion of the gas dynamic type laser including devices utilizing specific products of combustion, reference is made to U.S. Pat. No. 3,713,030, incorporated herein as if set out at length. See, also, "Gas Dynamic Lasers" by E. T. Gerry, *American Physical Society Bulletin*, Series II, Vol. 15, No. 4, p. 563, Apr. 1970 and "Gas Dynamic Lasers" by E. T. Gerry, *IEEE Spectrum*, pp. 51–58, November 1970; and "Performance of an Unstable Oscillator on a 30 kW cw Gas Dynamic Laser" by E. V. Locke, R. Hella, and L. Westra, Avco Everett Research Laboratory, *IEEE Journal of Quantum Electronics*, Vol. QE-7, pp. 581–583, December, 1971. However, electrically excited lasers and especially electrically excited convection cooled $CO_2$ lasers appear to be better suited than gas dynamic lasers for many applications such as, for example, laser fusion work, heat treating, welding and cutting.

Of the many types of lasers under development such as, for example, the HF/DF lasers and CO lasers, $CO_2$ lasers have the benefit of earlier and far greater development efforts. Further, over the past several years, research and development efforts have been concentrated on electrically excited convection cooled $CO_2$ lasers operating in both the open and closed gas cycle mode. Such lasers that utilize a single large discharge volume appear to be best suited for use in high power laser systems because such lasers offer, among other things, a clear aerodynamic design, minimum ducting, low pressure loss in the laser channel, a uniform active medium and high output power.

For a description of one type of such laser, reference is made to U.S. Pat. No. 3,721,915 and for a detailed description of the electron beam-sustainer stabilized type laser, reference is made to U.S. Pat. No. 3,702,973, incorporated herein as if set out at length.

The output power of the above-noted electron beam-sustainer stabilized lasers have been made very large and can be made as large as one might reasonably desire. What is necessary in such lasers is the provision of efficient uniform and high power electrical excitation of the gas volume, a high energy density, and uniform optical quality. The electron beam-sustainer stabilized laser solves all of the above problems and can provide uniform electrical discharges in large gas volumes at from subatmospheric pressures to atmospheric pressure and above. At the volumes and pressures readily available with electron beam-sustainer stabilized lasers, application of an electric field alone to pump a lasable gas or gas mixture to produce a self-sustaining discharge in the gas quickly leads to formation of high-current constricted arcs.

In accordance with the teaching of the aforementioned U.S. Pat. No. 3,713,030, a plasma and especially a lasable gaseous mixture is stabilized through substantially its entire volume even at pressures greater than atmospheric by making the electron-ion production mechanism in the plasma independent of the electromagnetic field through the use of an external ionization source such as a large area, high energy electron beam. The separation of the electron-ion production mechanism from the applied electric field permits the electric field applied to be much lower than that otherwise required for self-sustaining discharges.

Thus, plasma stabilization by this technique permits large volumes of laser gas to be efficiently and effectively electrically pumped to produce optimum population inversion and high output power. Lasers operating in accordance with this technique not surprisingly have come to be called electron beam-sustainer stabilized lasers.

Electron beam-sustainer stabilized lasers are inherently capable of providing a very high output power. However, heretofore the production of such output power with such lasers required the provision of large volumes of laser gas comprising commercial grade carbon dioxide, nitrogen and helium. In the forms presently available, such gases not only are very costly per se, but also require substantial storage space depending on the rate of use and laser output power provided. Further, the storage means for these gases are very heavy, especially as compared to the weight of the gases alone.

In the present state of the art, gas dynamic lasers operating on combustion products as a working gas provide a specific energy of 10 kilojoules per pound of combustion fuel and a stored oxidizer or 35 kJ/lb when operated in an airbreathing mode using ambient oxygen as oxidizer without debit to the weight base. Chemical lasers (HF/DF) afford 300 kilojoules/lb of fluorine without considering pumping equipment and diluent gases and 10–100 kJ/lb when taking such equipment into account. Prior art electric lasers employing $CO_2:N_2:He$ working gas mixtures have a specific energy of 25 kJ/lb and 45kJ/lb when gases are precooled. The chemical and electrical systems require storage and transport of difficult to handle chemicals.

It is an important object of the present invention to reduce the operating cost of and/or enhance the logistical flexibility of laser apparatus.

It is a further object of the invention to reduce overall weight and/or volume of laser apparatus and associated operating accessories and supply materials consistent with the preceding object.

It is a further object of the invention to raise laser specific energy compared to the above-discussed prior art, consistent with one or more of the preceding objects.

It is a further object of the invention to utilize existing electrical controls, laser cavity defining equipment and developed operational methods consistent with one or more of the preceding objects.

SUMMARY OF THE INVENTION

According to the present invention, the foregoing objects may be achieved by combining an electron beam-discharge laser, preferably of the type comprising an externally generated beam which is fired into a laser cavity having a non-self-sustaining discharge therein with separate control of the cavity discharge and the externally generated beam to avoid problems of gas discharge breakdown and arc formation and utilizing carbon dioxide as a working gas, with an airbreathing, hydrocarbon fuel burning engine, preferably a turbocompressor engine with compressed air, main burner, main turbine and after burner. The engine is operated to produce energy of combustion which is extracted as useful work and an exhaust gas mixture comprising carbon dioxide, nitrogen and hydrogen and a sufficiently low level of electronegative species so that the exhaust can be fed to the laser as the working gas therefor. The expansion of gases through the turbine or other expansion means of the engine provides a mechanical output which can be used for one or more of the following functions associated with operation of the laser:

a. driving a generator to provide the electric power for inducing and maintaining electric discharge in the laser;

b. compressing the exhaust gas for entry into compressed storage to await a desired time for admission from such compressed storage to the laser cavity for operation.

The energy of combustion generated by the exothermic reaction of fuel and ambient air oxygen can be utilized in an additional mode (in addition to extraction of work through the turbine to drive a compressor or generator) to enhance laser operation. That is, the exhaust gases may be expanded through a turbo expander or expansion nozzle or the like to achieve an isentropic cooling of the exhaust gases so that they enter the laser cavity at a low temperature, preferably about 200°K, but in any event, below 300°K. Such cooling increases gas density and also increases the temperature interval through which the gas can be heated before kinetic effects destroy the laser inversion. This permits laser operation in an electrical discharge laser with greater efficiency and specific energy than with room temperature gases, allowing a more compact laser cavity and resulting in more laser output per unit mass of gas. Such data has been compiled for electric discharge lasers using carbon dioxide - nitrogen - helium mixtures and carbon dioxide - nitrogen - hydrogen mixtures.

Other objects, features and advantages of the invention will be apparent from the following detailed description of preferred embodiments taken in connection with the accompanying drawings, in which:

DETAILED DESCRIPTION OF PREFERRED EMBODIMENTS

Figure 1:
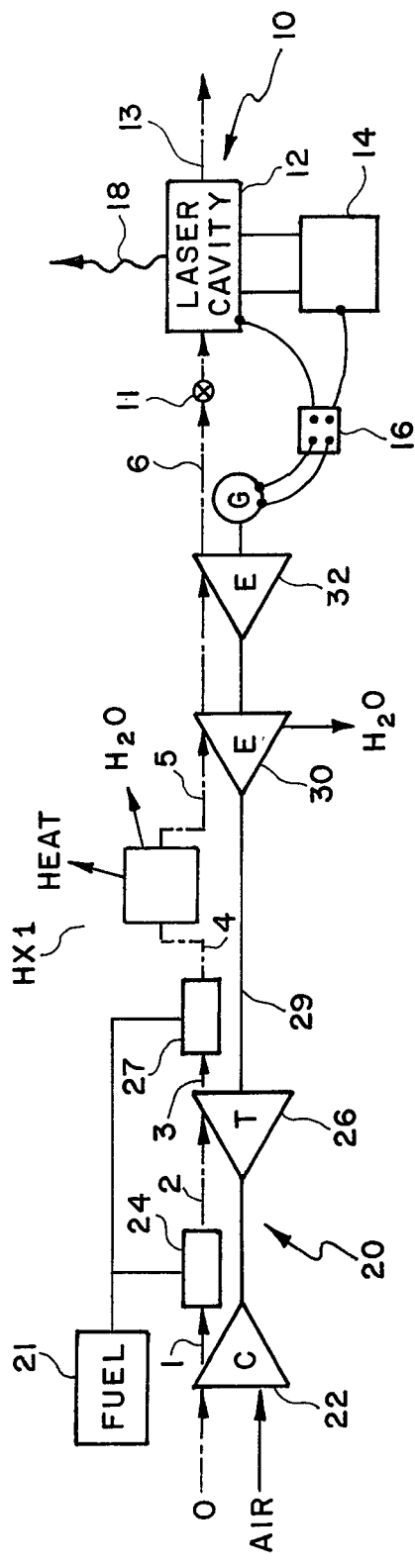
FIG. 1 is a schematic diagram of a system for combining an airbreathing combustion engine with electric discharge laser according to a first preferred embodiment of the present invention.
Figure 2:
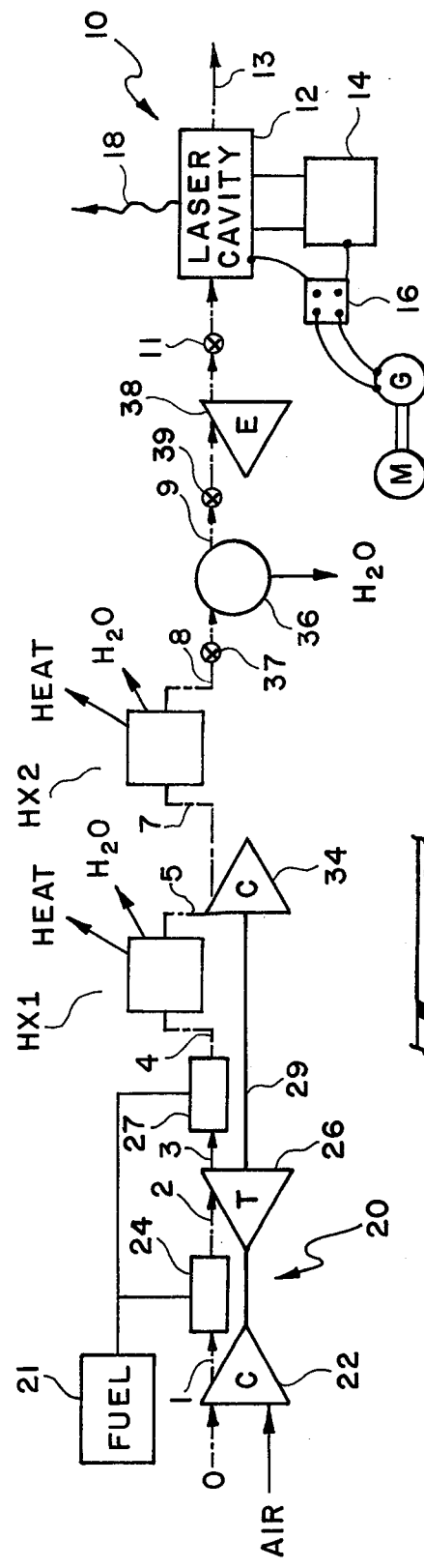
FIG. 2 is a schematic diagram of a system for combining an airbreathing combustion engine with electric discharge laser according to a second preferred embodiment of the present invention.

Referring now to the embodiments of both FIGS. 1 and 2, common elements are described. Both systems comprise an electron discharge laser 10 comprising means defining a laser canopy 12, an external electron gun 14, an electric power supply controller 16 and an electrical power source such as a generator G. Working gas is admitted to the laser cavity via a valve 11 and exhausted through an exhaust line 13 and output light from the laser is indicated schematically at 18. The electron generator 14 is operated under vacuum and vacuum pumping means (not shown) are provided as part of such equipment. The laser cavity 12 may be operated at atmospheric pressure under pulsing conditions or under partial vacuum for continuous wave (CW) operation. Electrons from the gun 14 may be admitted to the cavity 12 via a constricted passage or through an air-tight window. The laser 10 may be the apparatus described in the above cited U.S. Pat. No. 3,702,973. The laser cavity defining means 12 includes laser mirrors for drawing out the output beam 18 and discharge electrodes which produce a stable and controlled discharge in which the rates of available recombination processes therein exceed the rate of ionization of the discharge per se, making it per se a non-self-sustaining discharge. Self-sustaining discharges are produced when the electron gun 14 is operated to produce an ionizing electron beam entering the laser cavity 12. The laser cavity electrodes typically utilize a power supply of 50 kilovolts at 5 milliamperes and the electron gun 14 utilizes a 150 kilovolt power supply at 5 milliamperes.

In addition to usage in connection with electron beam lasers which is preferred and provides a distinctly advantageous combination, the method and apparatus of the invention may be employed in connection with other electric discharge lasers including the TEA type lasers described by Beaulieu, *Appl. Phys. Lett.*, 16:504 (1970), UV excited discharge - Richardson, *IEEE Journal of Quantum Electronics*, QE-9:236 (1973) and the simplified electron gun apparatus of Fenstermacher et al, *Appl. Phys. Lett.*, 20:56 (1972).

However, the practice of the invention is particularly advantageous in connection with very high power output lasers.

The systems further comprise a turbocompressor 20 which has the following elements: a fuel tank 21, compressor 22, main combustor 24, turbine 26 coupled to the compressor in driving relation, after burner combustor 27 and an output shaft 29.

The FIG. 1 embodiment further comprises turboexpanders 30 and 32 driven off output shaft 29 and further comprises coupling the output shaft 29 to drive the generator G.

The FIG. 2 embodiment further comprises a compressor 34 driven by shaft 29 and a storage tank 36 with inlet and outlet valves 37 and 39, respectively therefor, and a turbo-expander 38.

In both embodiments, the path of working fluid is indicated by chain lines and the various transient states of working fluid are indicated by the milestone points 0-9′. Referring to these points, temperature entropy diagrams are plotted for the two embodiments in FIGS. 3 and 4, respectively.

Figure 3:
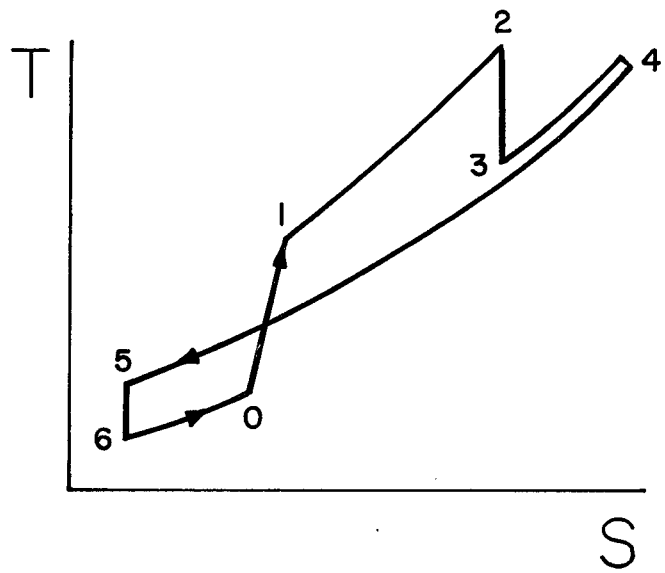
FIGS. 3 and 4 are temperature-entropy (Ts) diagrams for operation of the systems of FIGS. 1 and 2, respectively.

For FIGS. 1 and 3, incoming ambient air (0) is compressed to achieve the temperature entropy condition indicated at point 1 of FIG. 3, then burns (1-2) in combustor 24, expanded through turbine 26 (2-3), afterburned in combustor 27 (3-4), passed through heat exchanger HX1 to reject heat (4-5), isentropically expanded through expanders 30 and 32 (5-6), and then the exhaust gas mixture is utilized in laser 10 (6-13).

Figure 4:
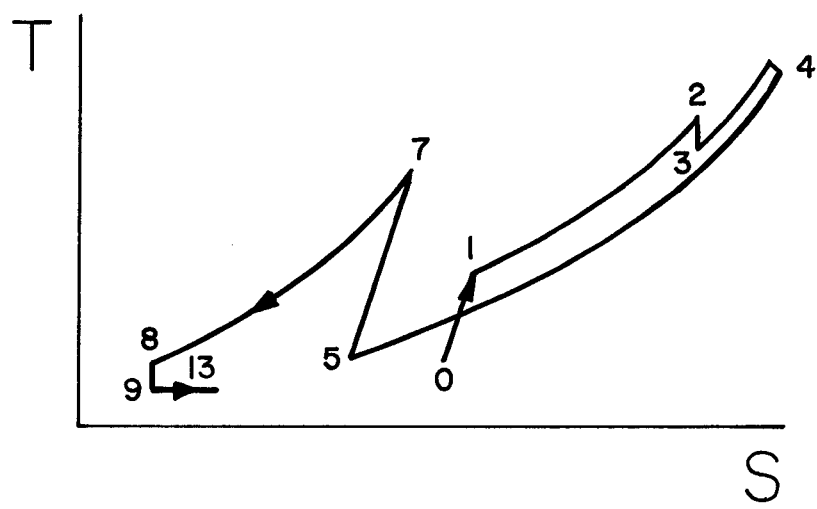

A different cycling for FIGS. 2 and 4 starts at point 5 and comprises compression through compressor 34 (5-7), passing through heat exchanger HX2 (7-8), isentropic expansion through expander 38 [and in part in tank 36 (8-9)] and usage in laser 10 (9-13'). The laser cavity inlet temperature (6 in FIG. 3 and 9 in FIG. 4) is preferably 200°K.

The FIG. 2 embodiment may employ a separate prime mover M to drive the generator, or may utilize the output shaft 29 of the turbocompressor engine 20 when the turbocompressor is not in use for driving compressor 34.

Typical parameters for the FIG. 2 embodiment are as follows:

Taking a mean molecular weight of air of 29 and a specific heat of 1.09 joules per gram-degree K and a ratio of specific heats of 1.4 and utilizing compressor 34 to provide 68 atmospheres pressure in storage tank 36, putting in work of 900 joules per gram of gas for a single stage compressor (and 570 for a three-stage compressor) and putting 521 joules per gram of work into compressor 22 for a compressor ratio of 20, providing combustion gases at 1800°K for expansion through the turbine consistent with practical materials, 900 joules per gram of work can be extracted for use in the gas turbine. For a high power laser using 50 kilojoules per pound of gas, for example, 100 pounds of gas stored at tank 36 would be needed for a five second run. As the gas is drained from the tank, temperature in the tank drops and expansion within the tank itself supplements the action of expander 38. These calculations indicate that for a four foot outer diameter storage tank 36 and a very high shaft horsepower turbocompressor, the five seconds worth of laser gas can be generated and stored in 60 seconds. The system of FIG. 2 may be complete as shown in the drawing or may be split with a central unit charging storage tanks 36 and with storage tanks 36 being disbursed to a number of field lasers 10. Where the two portions of the apparatus are coupled, the shaft 29 can be declutched from compressor 34 and applied to drive generator G, in lieu of the separate prime mover M.

A system in accordance with FIG. 1 operating as a high power laser at 50 kilojoules per pound of gas, can provide, for example, 20 pounds of gas per second by consuming 1.3 pounds of a hydrocarbon fuel (e.g., kerosene, JP-4, etc.) to generate 26,000 kilowatts of thermal energy. For a gas turbine efficiency of about 20%, about 5,000 kilowatts of shaft power may be generated or 7,000 shaft horsepower. At a specific weight of a half pound per shaft horsepower, an engine of only 3500 pounds is indicated.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

We claim:
1. Method of producing high power gas laser action comprising an energy population inversion in a gaseous lasing species in a gas laser having a high power density in relation to weight and volume of associated equipment and stored fluids comprising:
   a. exothermically burning a hydrocarbon fuel with ambient air to produce gaseous combustion products comprising energy of combustion and a gas mixture comprising a polyatomic lasing gas, diluent and deactivant gases, said deactivant gases comprising hydrogen and water vapor;
   b. isentropically expanding the combustion products gas mixture;
   c. removing said water vapor;
   d. reducing the temperature of the combustion products to less than about 300°K using said energy of combustion;
   e. passing said cooled combustion products through a laser beam producing region in said laser;
   f. maintaining an electrical discharge in said laser beam producing region; and
   g. controlling said discharge and combustion products passage rate to produce an energy population inversion in said polyatomic lasing gas and to generate a laser beam in said laser beam producing region.

2. Laser operation method in accordance with claim 1 wherein said population inversion is provided continuously.

3. Laser operation method in accordance with claim 1 wherein said population inversion is provided in the pulsed mode.

4. Laser operation method in accordance with claim 1 wherein said combustion products initially include oxygen and at least a portion of said oxygen is removed prior to passing said cooled combustion products through said laser beam producing region.

5. Laser operation method in accordance with claim 1 wherein said discharge is produced by maintaining an electric field across the laser beam producing region and introducing electrons therein.

6. Laser operation method in accordance with claim 5 wherein said combustion products are compressed and stored prior to admission to said laser beam producing region using said energy of combustion to achieve compression.

7. Laser operation method in accordance with claim 6 wherein said combustion products initially comprise unburnt oxygen and, prior to admission to said laser beam producing region are afterburned to essentially consume the remaining oxygen and said water vapor is removed by condensation.

8. Apparatus for producing a laser beam comprising:
   a. means for exothermically burning a hydrocarbon fuel with ambient air to produce gaseous combustion products comprising energy of combustion, a polyatomic lasing gas, diluent and deactivant gases, said deactivant gases comprising hydrogen and water vapor;
   b. means for isentropically expanding the combustion products gas mixture;
   c. means for removing said water vapor from said combustion products;
   d. means for reducing the temperature of the combustion products to less than about 300°K using said energy of combustion;

e. means for defining in an electric discharge laser a laser beam producing region for receiving said combustion products including means for maintaining an electric field across said laser beam producing region and means for generating an electron beam outside of said laser beam producing region and introducing it therein for producing a population inversion in said combustion products for generating a laser means;

f. electrical power supply control means for said electric discharge laser; and g. means defining an electrical power source connected to said laser via said control means.

9. Apparatus in accordance with claim 8 and further comprising:

a. means defining a compressed store of said combustion products comprising carbon dioxide, nitrogen and hydrogen; and b. means for drawing combustion products from said store, cooling said combustion products and delivering it to said laser beam producing region.

10. Apparatus in accordance with claim 9 wherein said means for drawing comprises a turbo-expander.

11. Apparatus in accordance with claim 9 and further comprising:

a. means for generating said combustion products including an airbreathing hydrocarbon fuel burning engine which produces said combustion products and output power; and b. means for compressing said combustion products using said output power and admitting said combustion products to said storage tank.

12. Apparatus in accordance with claim 11 wherein said engine compresses incoming ambient air, then burns said fuel therein under conditions leaving unburnt oxygen, then expands said gas through a work producing device, then afterburns said exhaust gases to substantially consume the remaining oxygen.

13. Apparatus in accordance with claim 12 wherein said engine comprises a turbocompressor.

14. Laser operation method in accordance with claim 5 wherein said combustion products are continuously generated, through use of energy of combustion and fed to said laser beam producing region.

15. Laser operation method in accordance with claim 14 and further comprising:

a. applying said energy of combustion to produce the electrical discharge in said laser beam producing region.

16. Apparatus in accordance with claim 8 and further comprising:

a. means defining a turbine driven by said combustion products and an electrical generator driven by said turbine and electrically connected to said electric discharge laser via said electrical power supply control means.

17. Apparatus in accordance with claim 16 and further comprising:

a. means defining an expander for isentropically cooling the combustion products before admission to said laser beam producing region.

18. Laser apparatus comprising means defining an airbreathing, hydrocarbon fuel burning turbocompressor engine with an air compressor, main burner, after burner and compressor driving turbine for burning a hydrocarbon fuel and for creating exhaust gases therefrom, means for separating condensable products including water vapor from the exhaust gases of said turbocompressor engine, means defining an electric discharge laser, means for channeling uncondensed exhaust gases of said turbocompressor engine to said gas as working gas thereof electric generator means driven by said turbocompressor engine and electrically connected to said electric discharge laser to provide electrical energy thereto for creating a population inversion in said laser working gas, and 19. Laser apparatus comprising means defining an airbreathing, hydrocarbon fuel burning turbocompressor engine with an air compressor, main burner, after burner and compressor driving turbine for burning a hydrocarbon fuel and for creating exhaust gases therefrom, means for separating condensable products including water vapor from the exhaust gases of said turbocompressor engine, means defining an electric discharge laser, means for channeling uncondensed exhaust gases of said turbocompressor engine to said gas as working gas thereof electric generator means driven by said turbocompressor engine and electrically connected to said electric discharge laser to provide electrical energy thereto, means defining a compressed gas storage reservoir, means defining a compressor driven by said turbocompressor engine for compressing exhaust gases of said turbocompressor engine to a level for admittance to said reservoir, and means for channeling gas from said storage reservoir to said laser as working gas thereof.

* * * * *